US008627806B2

(12) United States Patent
Festor et al.

(10) Patent No.: US 8,627,806 B2
(45) Date of Patent: Jan. 14, 2014

(54) VALVE BODY ASSEMBLY

(75) Inventors: Aude Festor, Lyons (FR); Sebastien Adenot, Pontoise (FR); Bastien Rechke, Le Vesinet (FR)

(73) Assignee: Valeo Systemes de Controle Moteur, Cergy Saint-Christophe (FR)

( * ) Notice: Subject to any disclaimer, the term of this patent is extended or adjusted under 35 U.S.C. 154(b) by 362 days.

(21) Appl. No.: 13/002,133

(22) PCT Filed: Jun. 30, 2009

(86) PCT No.: PCT/EP2009/058214
§ 371 (c)(1),
(2), (4) Date: Mar. 16, 2011

(87) PCT Pub. No.: WO2010/000752
PCT Pub. Date: Jan. 7, 2010

(65) Prior Publication Data
US 2011/0155110 A1 Jun. 30, 2011

(30) Foreign Application Priority Data
Jul. 1, 2008 (FR) ...................................... 08 03725

(51) Int. Cl.
*F02M 25/07* (2006.01)
*F01P 1/06* (2006.01)
(52) U.S. Cl.
USPC ................ 123/568.12; 123/568.17; 123/41.4; 123/41.85
(58) Field of Classification Search
USPC ............. 123/568.11, 568.12, 568.17, 568.18, 123/41.4, 41.85; 251/305, 306, 307, 308, 251/359; 277/590, 591, 602, 606
See application file for complete search history.

(56) References Cited

U.S. PATENT DOCUMENTS

| 1,550,419 | A | * | 8/1925 | Beaurline | ................. 137/625.44 |
| 3,153,427 | A | * | 10/1964 | Burtis | ............................ 137/527 |
| 3,572,731 | A | | 3/1971 | Stecher | |
| 3,834,663 | A | * | 9/1974 | Donnelly | ....................... 251/173 |
| 4,058,290 | A | * | 11/1977 | Nelimarkka | ................... 251/306 |

(Continued)

FOREIGN PATENT DOCUMENTS

CH          677 012 A5     3/1991
GB        1 248 860 A     10/1971

OTHER PUBLICATIONS

International Search Report w/translation from PCT/EP2009/058214 dated Oct. 1, 2009 (4 pages).

*Primary Examiner* — Hai Huynh
(74) *Attorney, Agent, or Firm* — Osha Liang LLP

(57) ABSTRACT

The invention concerns an assembly of a valve body (A) and a seal (11). The valve body (A) includes a gas flow passage (4) and a valve shutter (6) mobile between an open position and a closed position obstructing the movement of the gases in the passage (4). The passage (4) being intended to be connected to a pipe (B) to enable gas to flow between them, the seal (11) being intended to be mounted between the passage (4) and the pipe (B) to provide a gas seal between them. The assembly is characterized in that the seal (11) forms a seat for the valve shutter (6) in the closed position. The seal provides, on the one hand, a seal between the passage and the pipe whether the valve shutter is in the open or the closed position and, on the other hand, a seal for the valve shutter in the closed position.

1 Claim, 4 Drawing Sheets

(56) References Cited

U.S. PATENT DOCUMENTS

| | | | |
|---|---|---|---|
| 4,281,817 A * | 8/1981 | Adams et al. | 251/305 |
| 4,296,915 A * | 10/1981 | Baumann | 251/174 |
| 4,407,483 A * | 10/1983 | Gachot | 251/287 |
| 4,545,566 A * | 10/1985 | Kammerer | 251/357 |
| 4,770,393 A * | 9/1988 | Hubertson | 251/306 |
| 4,840,114 A * | 6/1989 | Bauer et al. | 454/143 |
| 6,045,121 A * | 4/2000 | Barker et al. | 251/306 |
| 6,644,352 B1 * | 11/2003 | Pfetzer | 137/875 |
| 6,702,257 B1 * | 3/2004 | Mollmann | 251/306 |
| 6,976,480 B2 * | 12/2005 | Miyoshi et al. | 123/568.12 |
| 7,478,816 B2 * | 1/2009 | Olberding et al. | 277/628 |
| 2004/0026875 A1 * | 2/2004 | Banas | 277/628 |
| 2005/0011485 A1 * | 1/2005 | Ryan et al. | 123/295 |
| 2008/0302991 A1 * | 12/2008 | Tseng | 251/283 |
| 2012/0298066 A1 * | 11/2012 | Leroux | 123/193.5 |

* cited by examiner

VALVE BODY ASSEMBLY

The invention concerns an assembly of a valve body and a seal.

An automobile vehicle internal combustion engine includes a combustion chamber, generally comprising a plurality of cylinders, in which a mixture of fuel and combustive agent is burned to generate the work of the engine. The combustion-supporting agent is air, which is compressed or not according to whether the engine includes a turbocharger or not. The air may also be mixed with exhaust gases; this is known as exhaust gas recirculation. The gases admitted into the combustion chamber are referred to as the inlet gases.

In the case of an engine with a turbocharger, the air is admitted into the engine, compressed by a compressor, admitted into the cylinders, in which it is burned with the fuel, and then evacuated via the exhaust pipes. The exhaust gases drive a turbine fastened to the compressor and with it forming the turbocharger. The recirculation of the exhaust gases is referred to as "low pressure" recirculation when the exhaust gases are taken after the turbine and reintroduced before the compressor or "high pressure" recirculation when the gases are taken before the turbine and reintroduced after the compressor. For example, for a petrol engine, low-pressure recirculation makes it possible to reduce fuel consumption and to improve engine efficiency and, for a diesel engine, makes it possible to reduce pollution to conform to environmental standards.

The gases are therefore guided in various pipes. The movements of the gases are controlled by valves, which allow, obstruct or control the movements of the gases in a particular pipe.

In the case of an exhaust gas recirculation loop, a so-called "three-port" valve is generally provided; such a valve includes an inlet passage for gases entering the valve, a first outlet passage for gases leaving the valve, which is a direct outlet passage for the exhaust gases called the exhaust passage, and a second outlet passage for gases leaving the valve, called the recirculation passage, which is an inlet passage for the gases entering a cooler, which itself discharges into the recirculated exhaust gases port. The exhaust gases admitted into the inlet passage of the valve may be evacuated directly via the exhaust passage, which discharges into an exhaust pipe of the engine, or admitted via the recirculation passage into the cooler, at the outlet from which they are mixed with the inlet gases.

A valve shutter is mounted in the three-port valve to open, obstruct or regulate the recirculated exhaust gases port; the recirculation passage is placed in fluidic communication with a pipe guiding the gases into the cooler or may discharge directly into the cooler.

The structure of a three-port valve is generally as follows: a one-piece pipe (referred to hereinafter as the exhaust pipe) forms an inlet passage for gases entering the valve and a direct exhaust passage for gases leaving the valve. This exhaust pipe includes an orifice at which it is fixed to a member known as the valve body, in which the recirculation passage is formed and with which the exhaust pipe is in fluidic communication via this orifice. The valve body includes in particular the valve shutter and its rotation drive motor.

A gas seal must be provided between the exhaust pipe and the valve body. The temperature of the exhaust gases to be recirculated entering the cooler is very high; consequently, an elastomer-type seal is unsuitable and a metal seal is preferably fixed between the pipe and the valve body. Because of the differential thermal expansion of the valve shutter and the valve body, it is necessary to leave a clearance between the edge of the valve shutter and the internal surface of the wall of the passage of the valve body across which the valve shutter moves; as a result the valve shutter does not rub against the walls of the passage in which it is accommodated, even at high temperatures.

When the valve shutter is in the closed position, its function is to obstruct the recirculated exhaust gases passage and to oblige those gases to flow only toward the exhaust passage. Nevertheless, a problem arises in that, because of the clearance referred to above, exhaust gases may leak into the recirculation pipe with the valve shutter in the closed position. In particular, such exhaust gas leaks produce smoke and degrade engine performance.

The invention aims to propose an assembly that is free of gas leaks and comprises a valve body and a seal, the valve body including a gas flow passage and a valve shutter for obstructing movement of the gases in that passage.

The invention stems more particularly from the necessity, because of the high temperature of the exhaust gases, for the presence of a clearance between the edges of a valve shutter and the surface of the wall of the passage of the valve body of a three-port valve for recirculation of the exhaust gases of an automobile vehicle internal combustion engine. The Applicant is nevertheless not seeking to limit the scope of its rights to this application alone and aims to solve the more general problem of sealing a valve shutter in a valve body including a passage intended to be connected to a pipe in the presence of a flow of gas at high temperature. Even more generally, the Applicant intends to solve a problem of sealing a valve shutter of a valve body intended to be connected to a pipe.

To this end, the invention concerns an assembly of a valve body and a seal, the valve body including a gas flow passage and a valve shutter mobile between an open position and a closed position obstructing the movement of the gases in the passage, the passage being intended to be connected to a pipe to enable gas to flow between them, the seal being intended to be mounted between the passage and the pipe to provide a gas seal between them, characterized in that the seal forms a seat for the valve shutter in the closed position.

Thanks to the invention, the seal provides, on the one hand, a seal between the passage and the pipe whether the valve shutter is in the open or closed position and, on the other hand, a seal for the valve shutter when in the closed position; the seal forms a seat for the valve shutter when in the closed position, i.e. it prevents movement of gases, on the one hand, between the valve shutter and the passage and, on the other hand, between the valve shutter and the pipe.

In one embodiment the seal includes a metal plate pierced by a window for the gases to pass through, the seal forming a seat for the valve shutter over at least a part of its internal periphery defining the window.

In one embodiment the plate includes, in this case, on its internal periphery, at least one abutment tongue for an edge of the valve shutter.

In one particular embodiment at least one tongue lies substantially in the plane of the plate of the seal.

In one particular embodiment at least one tongue exerts a return force on the valve shutter in the closed position. Because of this return force, the contact, and therefore the seal, between the valve shutter and the seal is improved.

In one embodiment, in this case, at least one tongue forms an angle with the plane of the plate of the seal in the direction of the area of the valve shutter intended to come into contact with it and has some elasticity.

In one particular embodiment at least one tongue is curved so as to come into contact with the valve shutter on at least one edge surface of an edge of the valve shutter.

In one embodiment the seal includes means for fixing it to the valve body. In particular these fixing means may include at least one hole for a fixing screw to pass through.

In one embodiment the valve shutter is mobile in rotation and includes a plate intended to lie, in the closed position of the valve shutter, substantially in the plane of the seal, and the rotation axis of the valve shutter is offset relative to the plate, for example to extend into the passage of the valve body. It may be noted that such an embodiment is of benefit independently of the type of seal used, in that it makes it possible to reduce the exhaust gases head losses with the valve shutter in the obstructing position.

The invention further concerns an assembly of a valve body, a seal and a pipe, the valve body including a gas flow passage and a valve shutter mobile between an open position and a closed position obstructing movement of the gases in the passage, the passage being intended to be connected to the pipe to enable flow of gas between them, the seal being mounted between the passage and the pipe to provide a gas seal between them, characterized in that the valve body and the seal have the features of the assembly of a valve body and a seal as described above.

In one embodiment the assembly forms a so-called "three-port" valve having an inlet orifice for gases entering the pipe and an orifice for direct exhaust of gases leaving the valve. Said pipe allows direct circulation of the gases from said inlet orifice to said outlet orifice with said valve shutter in the obstructing position. The gas flow passage is connected to the direct gas circulation passage at an orifice formed on the wall of the latter, said orifice being adapted to be obstructed by said valve shutter.

The valve may be a three-port valve of an automobile vehicle internal combustion engine in which the direct gas circulation pipe is an exhaust pipe and the gas flow passage is a passage for recirculation of the exhaust gases to a heat exchanger.

In one embodiment of said valve, said valve shutter comprises two wings on respective opposite sides of its rotation axis.

In a first embodiment, the window of said seal then extends to either side of said rotation axis of the valve shutter and each part of the window situated on one side of said axis is closed by a respective wing of the valve shutter. Each of said parts of the window may be provided with said abutment tongues adapted to cooperate with each of the wings of the valve shutter.

In another embodiment, the window lies on one side of the rotation axis and the seal has an obstructing part partially closing said orifice formed on the wall of the direct gas circulation pipe on the other side of the rotation axis. In the obstructing position of the valve shutter one wing of said valve shutter closes said window and the other faces said obstructing part of the seal.

The invention further concerns a seal for the assembly of a valve body and a seal described above.

Of course, in the above description of the invention, references to the flow of gases between a passage and a pipe is to be understood as meaning that the gases may flow from the passage to the pipe or from the pipe to the passage.

The invention will be better understood with the aid of the following description of a preferred embodiment of the valve of the invention, given with reference to the appended drawings, in which.

The terms front and back are chosen in a purely conventional and arbitrary way to simplify the description of the valve but do not prejudice the orientation of the valve in use. Here front and rear are relative to the plane of the seal of the valve shutter, with rear referring to the end of the recirculated exhaust gases passage leading to the heat exchanger.

Figure 1:
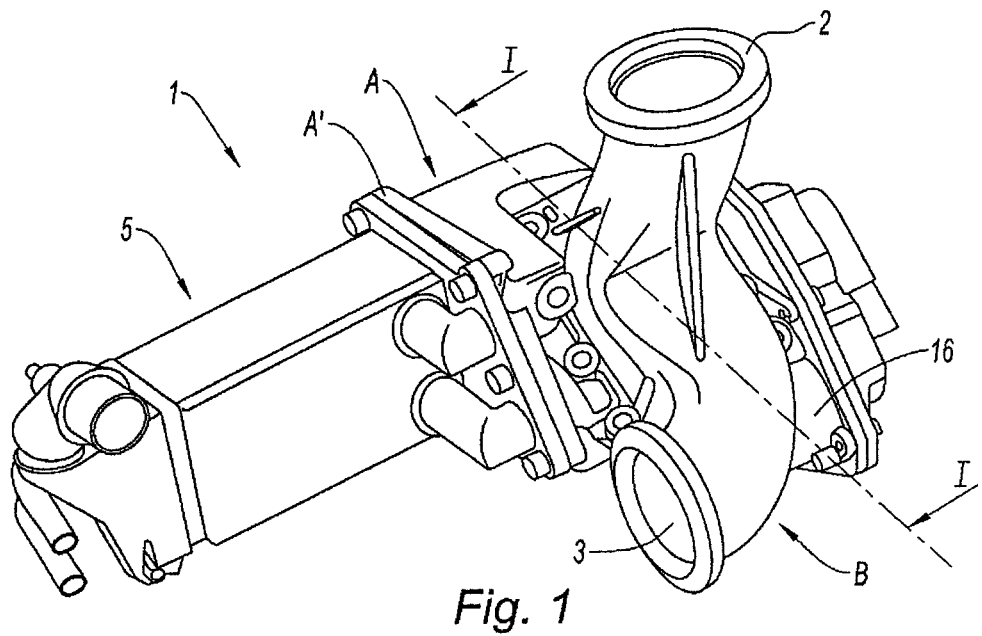
FIG. 1 is a perspective view of a three-port valve connected to a heat exchanger, for recirculating the exhaust gases of an automobile vehicle.

Functionally, see FIG. 1, a so-called "three-port" valve 1 includes an inlet passage 2 for gases entering the valve, a first gas outlet passage 3 and a second gas outlet passage 4. Structurally, the valve 1 includes a valve body A on which is mounted and to which is fixed an exhaust pipe B; the exhaust pipe forms the inlet passage 2 and the first outlet passage 3 and the valve body A includes the second outlet passage 4.

Note that, by definition, a valve is a component including a valve shutter and various passages and a valve body is the structural element of the valve that supports the valve shutter 6.

The first outlet passage 3 is a direct exhaust gases outlet passage; it is referred to as the exhaust passage 3. The second outlet passage 4 forms a gas inlet passage of a cooler 5, itself discharging into the recirculated exhaust gases port of the engine and guiding the exhaust gases toward the manifold for admitting the gases into the cylinders (upstream or downstream of the compressor or compressors); this second passage is referred to as the recirculation passage 4. The cooler 5 is fixed to the valve body A by means of a flange A' of the valve body A and discharges directly into the recirculation passage 4.

At the outlet from the cylinders the exhaust gases admitted into the inlet passage 2 of the valve 1 may be evacuated directly via the exhaust passage 3, which discharges into an exhaust pipe of the engine, or admitted into the cooler 5 via the recirculation passage 4. Thus either the exhaust gases flow only in the exhaust pipe B (i.e. functionally in the inlet passage 2 and the exhaust passage 3 of the valve 1), also referred to here as the direct gas circulation pipe, or additionally in the recirculation passage 4, for example via an orifice formed in the wall of said direct gas circulation pipe and adapted to be obstructed by said valve shutter 6.

The invention applies to the connection between the exhaust pipe B and the passage 4 of the valve body A.

Figure 5:
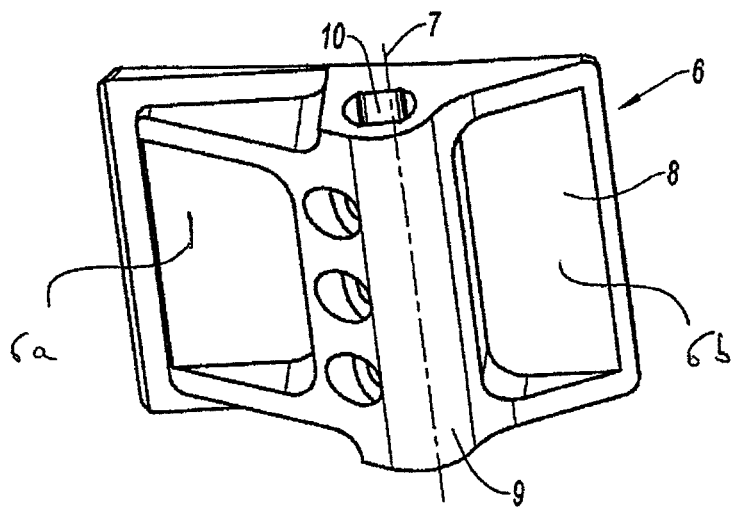
FIG. 5 is a perspective view from behind of the valve shutter from FIG. 2.

The valve shutter 6 is rotatable about an axis 7 (here the term axis 7 refers both to the mechanical part and to its direction). Referring to FIG. 5, the valve shutter 6 includes a rectangular plate 8 that has a substantially plane front face. On its rear face, the plate 8 supports a central portion 9 forming a protrusion 9 including a bore 10 through which the axis 7 for driving the valve shutter 6 in rotation passes. The valve shutter 6 pivots about its rotation axis 7.

The rotation drive axis 7 of the valve shutter 6 is driven by a motor, for example a DC motor, not shown, mounted in a housing 16 of the valve body A (here a cylindrical housing).

Note that the rotation axis 7 of the valve shutter 6 is offset relative to the plate 8 of the valve shutter 6, i.e. is not in the plane of the plate 8 but lies at a distance from the plate 8, and is here substantially parallel to the plate 8. This arrangement is linked to the structure of the valve body A and is explained hereinafter. The rotation axis 7 of the valve shutter 6 moreover extends substantially centrally relative to the rectangle defining the shape of the plate 8; to be more precise it is slightly off-axis and offset toward one side of this rectangle (this naturally refers to the position of the axis relative to the plate when orthogonally projected onto the plate 8).

When the valve shutter is open, the recirculation passage 4 and thus the cooler 5 are in direct communication with the exhaust pipe B; this communication may be obstructed by the valve shutter 6.

A seal 11 is fixed between the recirculation passage 4 of the valve body A and the exhaust pipe B. The seal 11 takes the form of a generally plane metal plate pierced by a gas passage window 12. Thus the seal 11 has the shape of a substantially rectangular frame 11. Fixing lugs 13 are provided on the exterior edges of the frame 11; each lug 13 includes a hole 14 for a fixing screw or a centering pin that cooperates with a corresponding bore of the valve body A, here bores at the periphery of the recirculation passage 4. Holes 14' are also provided directly in the frame of the seal 11 (i.e. with no lugs).

Here the valve body A, the exhaust pipe B and the seal 11 are arranged to make it possible for the same fixing screws to fix these three elements together: each screw thus passes through the exhaust pipe B, the seal 11 and the valve body A. Thus the seal 11 is fixed between the facing surfaces of the exhaust pipe B and the valve body A.

At least part of the internal periphery of the seal 11 forming the window 12 is adapted to form a seat for the valve shutter 6 when in the closed position. Thus in the closed position the valve shutter 6 presses on the seal 11.

Various embodiments of the seal 11 providing this valve shutter seat function are described next. The other elements of the valve (see above) are identical, similar or comparable in all embodiments and are therefore not described again in the various embodiments. Moreover, the same reference numbers are used for structural elements of identical, similar or comparable function.

Figure 2:
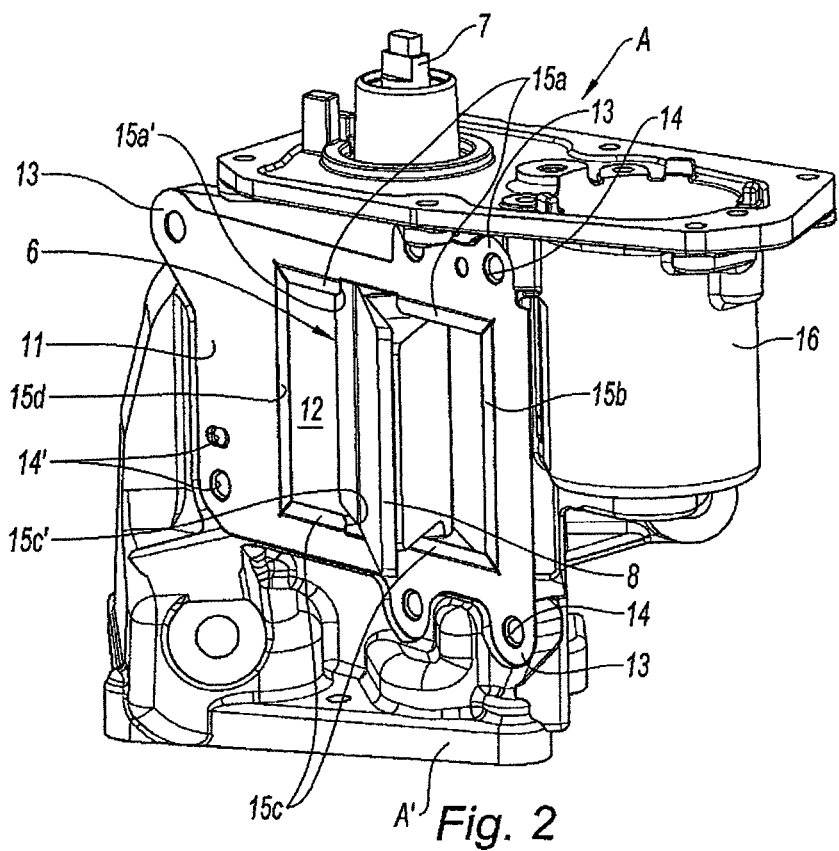
FIG. 2 is a perspective view of the body of the valve from FIG. 1 seen from the front, without the heat exchanger and without the exhaust passage, turned approximately 90° in the anticlockwise direction and with a seal of a first embodiment of the invention, the valve shutter being in the open position.
Figure 3:
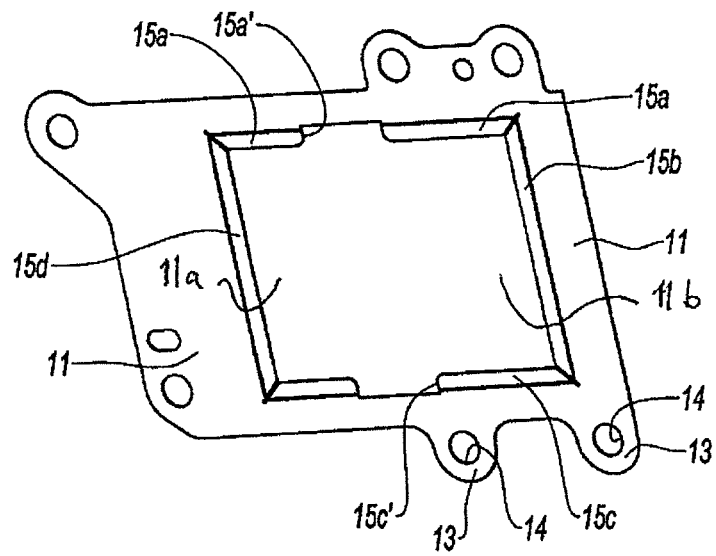
FIG. 3 is a perspective view of the seal from FIG. 2.
Figure 4:
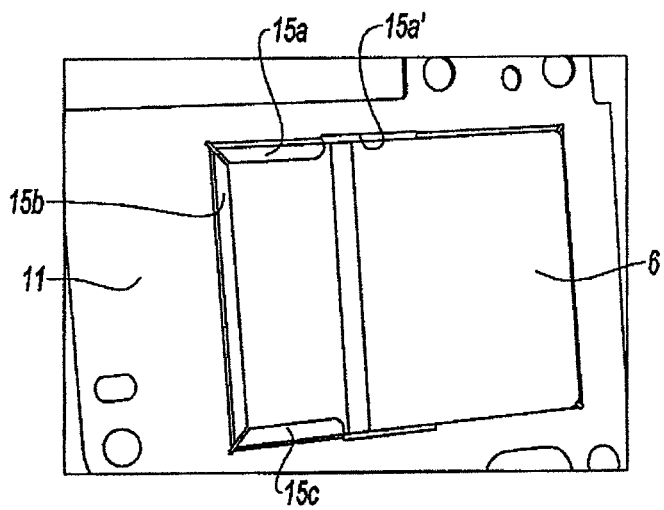
FIG. 4 is a perspective view of the valve shutter and the seal from FIG. 2 with the valve shutter in the closed position.

In a first embodiment represented in FIGS. 2 to 4, the seal 11 includes on its internal edges abutment tongues 15a, 15b, 15c, 15d for the valve shutter 6, to be more precise for its edges. These tongues 15a-15d are plane and in the embodiment represented lie in substantially the same plane as the plate forming the seal 11. They are arranged so that transverse (relative to the gas flow) surface portions of the valve shutter 6 situated along its edges come into contact with them.

To be more precise, referring to FIGS. 3 and 4, the lateral tongues 15b, 15d extend the full length of the corresponding internal edge of the seal 11, whereas the central parts of the upper tongue 15a and the lower tongue 15c are interrupted by a respective gap 15a', 15c' for the valve shutter 6 to pass through. Once again, and as for the concepts of front and rear, the concepts of upper, lower and lateral (right and left) are arbitrary and correspond to upper, lower and lateral (right and left) as seen in FIG. 2; they do not prejudice how the valve 1 is oriented in the engine.

The gaps 15a', 15c' in the upper tongue 15a and the lower tongue 15c allow the valve shutter 6 to pass through the seal and to pivot about its axis 7. In the open position of the valve shutter 6, as seen in FIG. 2, the valve shutter 6 does not obstruct the window 12 and its plate 8 extends through the gaps 15a', 15c'; part of its plate 8, situated to the right of the axis 7 in FIG. 2, lies in front of the seal 11, and the other part, situated to the left of the axis 7, lies to the rear of the seal 11. In the closed position of the valve shutter 6, the valve shutter 6 bears on both sides of the seal 11. To be more precise, and as seen in FIG. 4, the transverse surfaces along the edges of the right-hand part of the valve shutter 6 bear on the tongues 15a, 15b, 15c that lie to the right of the gaps 15a', 15c' for the valve shutter 6 to pass through while the transverse surfaces along the edges of the left-hand part of the valve shutter 6 bear on the tongues 15a, 15c, 15d that lie to the left of the gaps 15a', 15c' for the valve shutter 6 to pass through; to be even more precise, it is clear that the edges of the right-hand part of the valve shutter 6 bear on the whole of the right-hand lateral tongue 15b and on the portions of the upper tongue 15a and the lower tongue 15c that lie to the right of the corresponding gaps 15a', 15c', whereas the edges of the left-hand part of the valve shutter 6 bear on the whole of the left-hand lateral tongue 15d and on the portions of the upper tongue 15a and the lower tongue 15c that lie to the left of the corresponding gaps 15a', 15c'.

Thus the rear surface of the right-hand part of the plate 8 of the valve shutter 6 bears on the front surface of the tongues 15a, 15b, 15c and the front surface of the left-hand part of the plate 8 of the valve shutter 6 bears on the rear surface of the tongues 15a, 15c, 15d. It is therefore clear why the rotation axis 7 of the valve shutter 6 is offset relative to the plane of the plate 8, i.e. relative to the plane of the seal 11 when the plate 8 is in closed position; in the closed position, the valve shutter 6 bears on both sides of the seal 11, its central part is in the plane of the seal 11 and its rotation axis is offset so that it lies inside the passage 4 of the valve body A, out of the plane of the seal 11.

The seal 11 thus forms a seat for the valve shutter 6 when in the closed position. This makes the valve 1 more leak-tight. On the one hand, the seal between the recirculation passage 4 and the exhaust pipe B is provided by the seal 11 fixed between them. On the other hand, in the closed position of the valve shutter 6, the seal between the valve shutter 6 and the recirculation passage 4, on the one hand, and between the valve shutter 6 and the exhaust pipe B, on the other hand, is provided by the contact between the transverse surfaces of the valve shutter 6 along its edges and the transverse surfaces of the tongues 15a-15d of the seal 11 forming a seat for the valve shutter 6.

In one particular embodiment of the first embodiment of the seal (with tongues), the tongues 15a-15d are adapted to have some elasticity or flexibility, in other words to exert a spring force on the valve shutter 6 and thus to apply some resistance to it; in this case, in the rest position (i.e. when the valve shutter 6 is open) the tongues 15a-15d are oriented toward the portion of the valve shutter 6 with which they are intended to be in contact in the closed position of the valve shutter; they thus form an angle with the plane of the plate forming the seal 11. Thus the right-hand lateral tongue 15b and the portions of the upper tongue 15a and the lower tongue 15c that lie to the right of the corresponding gaps 15a', 15c' extend with a small angle toward the front while the left-hand lateral tongue 15d and the portions of the upper tongue 15a and the lower tongue 15c that lie to the left of the corresponding gaps 15a', 15c' extend at a slight angle to the rear. Because of this, when the valve shutter 6 comes into contact with the tongues 15a-15d, it exerts a force on the tongues 15a-15d to force them into the transverse position (with the opposite orientation to their rest position). Because of the spring force generated by the flexibility of the tongues 15a-15d, the contact between the edges of the valve shutter 6 and the tongues 15a-15d is stronger and more uniform, since the tongues exert a return force on the valve shutter: this improves the seal.

Figure 6:
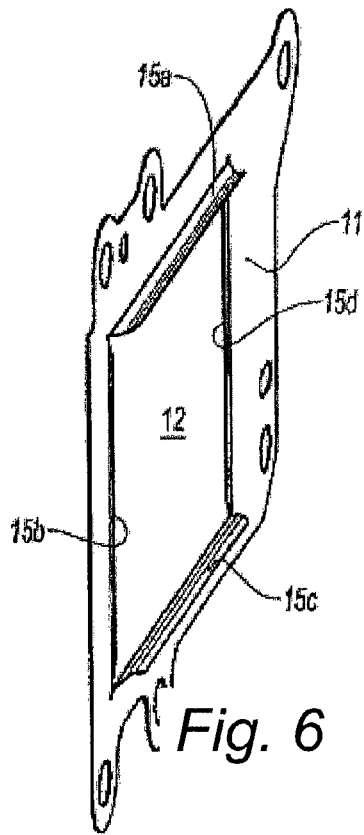
FIG. 6 is a perspective view from behind of a second embodiment of a seal for a valve of the FIG. 2 type.
Figure 7:
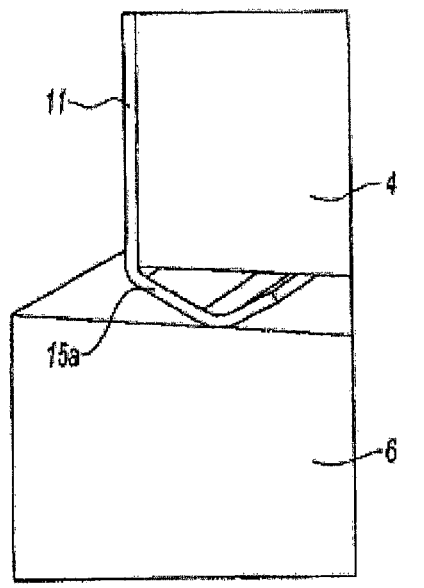
FIG. 7 is an enlarged sectional perspective view of an area of contact between a valve shutter and the seal from FIG. 6.
Figure 8:
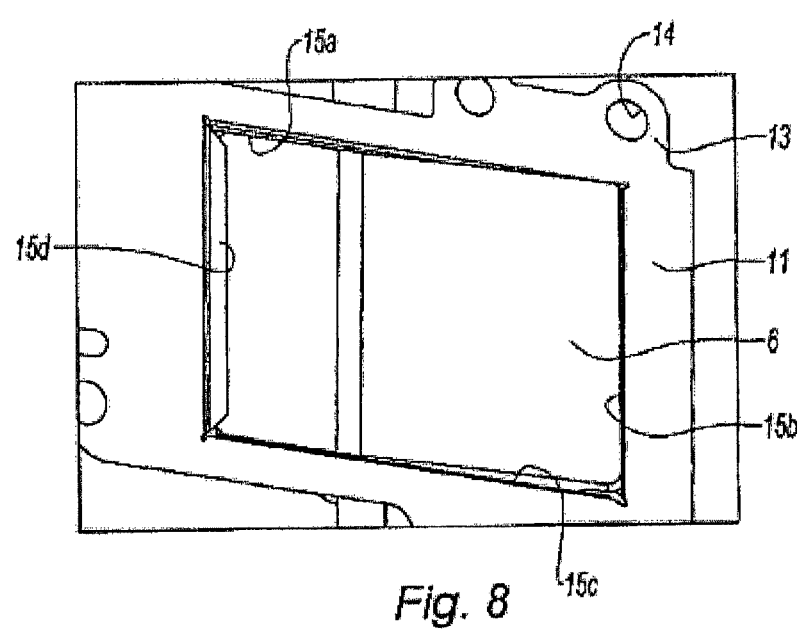
FIG. 8 is a perspective view of the valve shutter and the seal from FIG. 7 with the valve shutter in the closed position.
Figure 9:
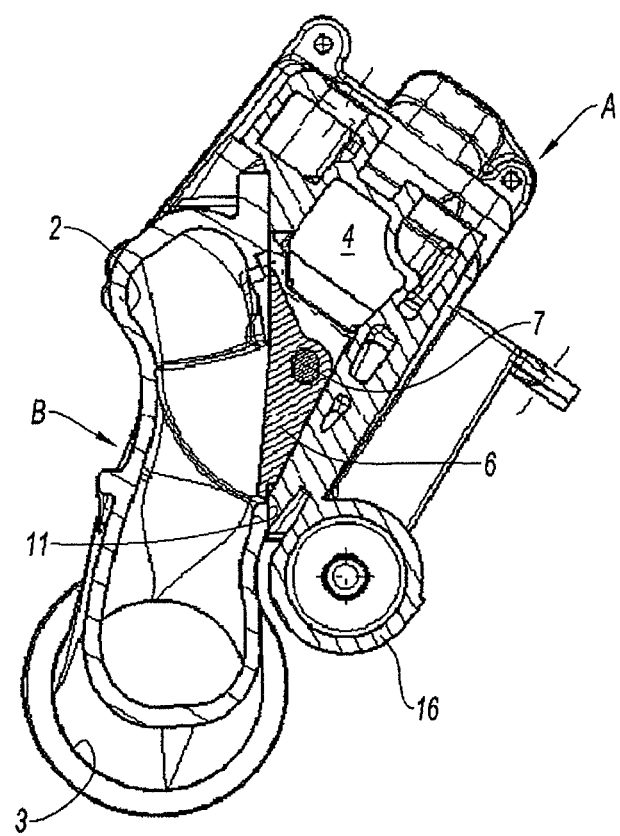
FIG. 9 is a view of the valve from FIG. 1 in section on the plane I-I indicated in FIG. 1 and with the valve shutter in the closed position.

In a second embodiment represented in FIGS. 6 to 8, the seal 11 includes curved tongues 15a, 15c formed from its internal upper and lower edges. Each tongue 15a, 15c is adapted to come into contact with the edge surface of the corresponding edge of the valve shutter 6; the tongues 15a, 15c have some flexibility to exert a spring force on the valve shutter 6 in this event. FIG. 7 shows contact between the upper tongue 15a of the seal 11 and the edge surface of the upper edge of the valve shutter 6. When it moves from the open position to the closed position, the valve shutter 6 comes into contact with the upper tongue 15a and the lower tongue 15c, which are sized to impede the passage of the edges of the valve shutter 6; the valve shutter 6 forces the tongues 15a, 15c to bend in the direction of their curvature, i.e. upward in the case of the upper tongue 15a and downward in the case of the lower tongue 15c. Because of this forced bending, against which the tongues 15a, 15c exert a return force, the valve shutter 6 may adopt a transverse position in the window 12 of the seal 11 with the upper tongue 15a in contact with the edge surface of the upper edge of the valve shutter 6 and the lower tongue 15c in contact with the edge surface of the lower edge of the valve shutter 6, the tongues 15a, 15c exerting on the corresponding edges of the valve shutter 6 a load (return force) in the direction of the contact, i.e. strengthening the contact and thus improving the seal.

The seal 11 further includes on its lateral edges transverse lateral tongues 15b, 15d similar to the lateral tongues of the seal 11 of the first embodiment (with or without the spring effect).

As seen in FIG. 8, in the closed position, the valve shutter 6 comes into contact with the upper curved tongue 15a and the lower curved tongue 15c, contact occurring along facing radial surfaces (the edge surfaces of the edges of the valve shutter 6 and the tongues 15a, 15c) and comes into contact with the right-hand lateral tongue 15b and the left-hand lateral tongue 15d, contact occurring along transverse facing surfaces (the transverse surfaces of the lateral edges of the valve shutter 6 and the transverse surfaces of the tongues 15b, 15d). As before, the right-hand edge of the valve shutter 6 is in contact with the front side of the right-hand lateral tongue 15b and the left-hand edge of the valve shutter is in contact with the rear side of the left-hand lateral tongue 15d.

In the embodiment shown, there are no gaps in the curved tongues 15a, 15c for the central part of the valve shutter 6 to pass through. The valve shutter 6 is therefore constantly in contact with and exerts a continuous pressure on the central part of the curved tongues 15a, 15c and comes into contact with the whole of their length in the closed position.

Moreover, in the embodiment shown, the two curved tongues 15a, 15c are both curved toward the rear and, as seen in FIG. 7, lie on the same side as the recirculation passage 4, to the rear of the seal 11. One tongue could be curved toward the front and the other toward the rear. The four tongues (upper tongue 15a, lower tongue 15c and lateral tongues 15b, 15d) could moreover be curved.

In another embodiment that is not shown, some internal edges of the seal 11 are in rubbing contact with the corresponding edges of the valve shutter 6; for example, the internal lateral edges of the seal 11 have contact tongues on transverse surfaces (as in the first embodiment (see FIGS. 2 to 4)) and the upper and lower edges have no particular structure, i.e. are straight and flush with the corresponding edges of the valve shutter 6 with which they are in rubbing contact.

In another embodiment that is not shown, the seal 11 is similar to the seal of the first embodiment with tongues (with or without rubbing), except that the gaps 15a', 15c' for the valve shutter to pass through are replaced by portions of curved tongues similar to the curved tongues 15a, 15c of the second embodiment (see FIGS. 6 to 8). Thus each of the upper and lower tongues includes a central part in the form of a curved tongue in continuous contact within the valve shutter regardless of its position and a right-hand part and a left-hand part in the form of transverse tongues in contact with the valve shutter only in the closed position.

In another embodiment that is not shown, the seal 11 includes a plate intended to be fixed between the recirculation passage 4 and the exhaust pipe B and including a window, tongues extending along the edges of the window but in a plane other than the plane of the plate. For example, the tongues may to this end include a portion perpendicular to the plate and, from the end of this perpendicular portion, a portion parallel to the plate (i.e. substantially transverse to the flow of the gases), intended to form an abutment for a transverse surface of an edge of the valve shutter. Thus the valve shutter abuts on the tongues in a parallel plane other than the plane of the plate.

In the various embodiments referred to above, the valve shutter 6 comprises two wings 6a, 6b provided on respective opposite sides of its rotation axis 7.

In a first mode, corresponding to that shown, the window 12 of said seal 11 extends to either side of said rotation axis 7 of the valve shutter and the parts 11a, 11b of the window 10 situated on respective opposite sides of said axis 7 are closed by respective wings 6a, 6b of the valve shutter. Each of said parts of the window may include said abutment tongues 15a, 15d, 15c; 15a, 15b, 15c adapted to cooperate with each of the flanges 6a, 6b of the valve shutter.

In another mode, not shown, the window extends on one side of the rotation axis and the seal has an obstructing part partially closing said orifice formed on the wall of the direct gas circulation pipe, on the other side. In other words, referring to FIG. 3, the seal in question corresponds to the seal shown in this figure except that the window 12 is defined only by the part 11 a and the space left free for the rotation of the axis 10. The rest of the window is obstructed by a blind part of the seal, for example produced by a pressing operation, set back from the plane occupied by the peripheral part of said seal. Thus in the obstructing position of the valve shutter, one of the wings 6a of said valve shutter would close said window and the other wing 6b would face said blind part of the seal.

The embodiments described and others may of course be combined. Other embodiments may be envisaged; in particular, the valve shutter and the window of the seal need not be of rectangular shape.

The invention claimed is:

1. An assembly comprising:
   a valve body;
   a seal; and
   a pipe,
   the valve body comprising a gas flow passage and a valve shutter mobile between an open position and a closed position, the closed position obstructing movement of the gases in the passage,
   wherein the passage is configured to be connected to the pipe to enable flow of gas between the passage and the pipe, wherein the seal is mounted between the passage and the pipe to provide a gas seal between the passage and the pipe, wherein the seal forms a seat for the valve shutter in the closed position, and wherein the assembly forms a "three-port" valve of an automobile vehicle internal combustion engine, wherein the pipe is an exhaust pipe providing an inlet passage for gases entering the valve and a passage for direct exhaust of gases leaving the valve, and wherein the passage forms a recirculation passage for recirculating the exhaust gases toward a heat exchanger and is connected to the pipe at an orifice formed on a wall of the latter.

* * * * *